United States Patent
Williams, Jr. et al.

(10) Patent No.: US 10,205,805 B2
(45) Date of Patent: Feb. 12, 2019

(54) DROPPING OR ADMITTING PACKETS TO AN OUTPUT QUEUE USING POLICY-BASED SCHEDULING AND VIRTUAL DESTINATION QUEUE OCCUPANCY VALUES

(71) Applicant: Cisco Technology, Inc., San Jose, CA (US)

(72) Inventors: John J. Williams, Jr., Pleasanton, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/357,346

(22) Filed: Nov. 21, 2016

(65) Prior Publication Data
US 2018/0146074 A1    May 24, 2018

(51) Int. Cl.
*H04L 29/06* (2006.01)
*H04L 12/931* (2013.01)
*H04L 12/741* (2013.01)

(52) U.S. Cl.
CPC .............. *H04L 69/22* (2013.01); *H04L 45/74* (2013.01); *H04L 49/354* (2013.01)

(58) Field of Classification Search
CPC ........ H04L 69/22; H04L 45/74; H04L 49/354
See application file for complete search history.

(56) References Cited

U.S. PATENT DOCUMENTS

| | | |
|---|---|---|
| 8,170,045 B2 | 5/2012 | Pan et al. |
| 2001/0026555 A1* | 10/2001 | Cnodder ................. H04L 47/10 370/412 |
| 2005/0083845 A1 | 4/2005 | Compton et al. |
| 2005/0094567 A1 | 5/2005 | Kannan et al. |
| 2007/0070907 A1 | 3/2007 | Kumar et al. |

(Continued)

OTHER PUBLICATIONS

Braden et al., "Recommendations on Queue Management and Congestion Avoidance in the Internet," RFC 2309, Apr. 1998, The Internet Society, Reston, VA, USA (seventeen pages).

(Continued)

*Primary Examiner* — Mohammad S Anwar
(74) *Attorney, Agent, or Firm* — The Law Office of Kirk D. Williams

(57) ABSTRACT

One embodiment is associated with dropping or admitting packets to an output queue using occupancy values of virtual destination queues which are updated according to different independent disciplines upon the enqueuing of a packet to an output queue, and the dequeuing of that packet from an output queue. In one embodiment, a virtual destination queue is determined for a packet. A policing decision is made whether to drop the packet or admit the packet to the output queue based on the occupancy level of the determined virtual destination queue, which is updated upon admission. Packets are dequeued in first-in-first-out order from the output queue. For a dequeued one or more packets, one or more of the occupancy values of the virtual destination queues are updated based a scheduling policy that is independent of the particular virtual destination queue(s) associated with the dequeued packets.

22 Claims, 8 Drawing Sheets

(56) References Cited

U.S. PATENT DOCUMENTS

2007/0248005 A1    10/2007  Pan et al.
2008/0279207 A1*   11/2008  Jones .................. H04L 47/20
                                                        370/412

OTHER PUBLICATIONS

Briscoe et al., "Byte and Packet Congestion Notification," RFC 7141, Feb. 2014, The Internet Society, Reston, VA, USA (forty-one pages).

Le et al., "Differential Congestion Notification: Taming the Elephants," Proceedings of the 12th IEEE International Conference on Network Protocols (ICNP'04), Oct. 2004, IEEE Society, Piscataway, NJ (eleven pages).

Pan et al., "Approximate Fairness through Differential Dropping," ACM SIGCOMM Computer Communications Review, Apr. 2003, vol. 33, Issue 2, ACM Press New York, NY (seventeen pages).

* cited by examiner

DROPPING OR ADMITTING PACKETS TO AN OUTPUT QUEUE USING POLICY-BASED SCHEDULING AND VIRTUAL DESTINATION QUEUE OCCUPANCY VALUES

TECHNICAL FIELD

The present disclosure relates generally to packet switching devices and other apparatus typically in a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. In using such technology, traffic can occur which causes certain packets to be dropped in favor of other packets in a network in a congestion avoidance effort.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
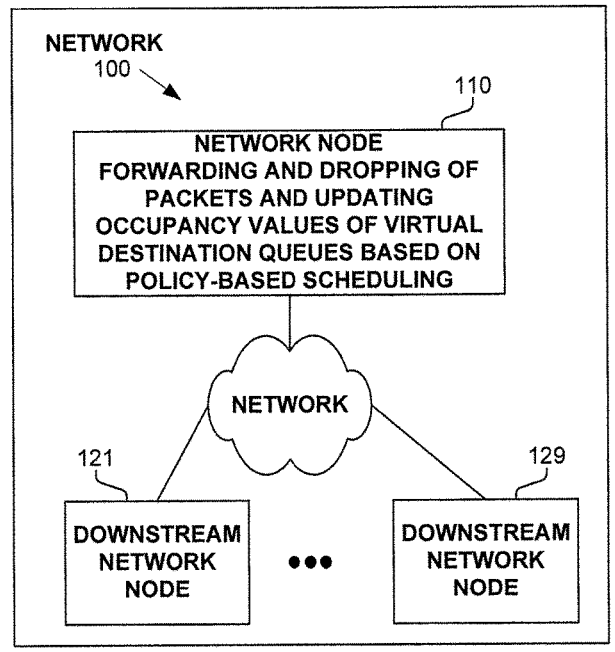
FIG. 1 illustrates a network operating according to one embodiment.

Disclosed are, inter alia, methods, apparatus, computer-storage media, mechanisms, and means associated with dropping or admitting packets to an output queue using policy-based scheduling and virtual destination queue occupancy values.

One embodiment includes a method. For each particular packet, a packet switching device performs operations including in response to determining to admit the particular packet to an output queue based on a particular destination queue occupancy value corresponding to the particular packet: admitting the particular packet to the output queue, and updating the particular destination queue occupancy value based on an enqueuing quantum of the particular packet. Each admitted packet is dequeued in first-in-first-out order from the output queue. One or more of the destination queue occupancy values are updated based on scheduling quantum and a scheduling policy, with the scheduling policy independent of the particular destination queue occupancy values associated with the dequeued packets.

One embodiment includes an apparatus, such as, but not limited to a network node (e.g., packet switching device, server). One embodiment comprises: storage that stores a plurality of destination queue occupancy values; an output queue; an admission controller; a dequeue controller; and a policy-based scheduling controller. For each particular packet: the admission controller retrieves from storage a particular destination queue occupancy value corresponding to the particular packet, admits the particular packet to the output queue in response to determining to admit the particular packet based on the particular destination queue occupancy value, and updates the particular destination queue occupancy value based on a particular quantum of the particular packet. For each admitted packet: the dequeue controller dequeues an admitted packet when at the head of the output queue, and provides the particular quantum of said dequeued admitted packet to a policy-based scheduling controller. The policy-based scheduling controller retrieves and updates one or more of the destination queue occupancy values determined from a scheduling policy and based on the particular quantum amount of one or more of the dequeued packets, with the scheduling policy being independent of the dequeued packets.

2. Description

Disclosed are, inter alia, methods, apparatus, computer-storage media, mechanisms, and means associated with dropping or admitting packets to an output queue using policy-based scheduling and virtual destination queue occupancy values. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

In one embodiment, virtual traffic management allows the policing of traffic at a significant cost savings by eliminating the physical queues needed for traffic management. It performs the accounting of individual queues as if they were part of a traffic manager. These queues can then be used for determining whether to forward or drop corresponding packets according to a policing discipline.

In one embodiment, the virtual traffic manager uses virtual destination queues. These are not actual physical queues, but are counters or storage locations (e.g., in a table or other data structure) that keeps track of the queue lengths/depths (e.g., "occupancy values") as if the queues existed and were draining according to a scheduling policy.

When a packet comes in, a decision is made whether to admit the packet to the output queue or to drop the packet. (All packets allowed to proceed goes through the same output queue.) The virtual destination queue occupancy value associated with the packet (e.g., virtual destination queue length or depth) is used as an input to a policer to make the admit or drop decision that will drop packets as the virtual destination queue occupancy value exceeds a threshold for the policing algorithm. Examples of such policers include, but are not limited to Weight Random Early Detection (WRED), Approximate Fair Drop (AFD), and Proportional Integral controller Enhanced (PIE).

In one embodiment for an admitted (non-dropped) packet, the virtual destination queue occupancy value is incremented according to the length of the packet as it is admitted to the output queue. When the output queue dequeues a packet, the packet length is used to decrement all the occupancy value(s) of one or more virtual destination queue(s) determined according to a scheduling policy for the output queue (without regard to any association to the actual packet dequeued). In other words, an occupancy value, that was increased for a particular virtual destination queue when the packet is enqueued, may or may not be decreased when that particular packet is dequeued.

Using independent enqueuing and dequeuing updating of the occupancy values for packets allows the drop policy for a virtual destination queue to effectively match what would occur if they were actual queues storing the traffic, without requiring these queues to be implemented in hardware. This approach provides a significant cost and implementation complexity savings.

FIG. 1 illustrates a network 100 operating according to one embodiment. Shown in FIG. 1 is network node 110 which includes a virtual traffic manager, and downstream network nodes 121-129. The virtual traffic manager drops or admits to the output queue each particular packet based on a policing decision of an occupancy value of a virtual destination queue associated with the packet (e.g., corresponding to a downstream or other constraint). Upon dequeuing of the particular packet from the output queue, the occupancy value(s) of one or more virtual destination queues are updated according to a scheduling policy that is independent of the selection of the virtual destination queue updated upon admission of the particular packet to the output queue.

In one embodiment, virtual destination queues in network node 110 are similar representations of queues in traffic managers, that is, they represent the output ports of downstream devices 121-129. By regulating the amount of traffic going to the downstream port to match its actual capacity, one embodiment prevents congestion upstream from affecting unrelated traffic downstream.

Figure 2A:
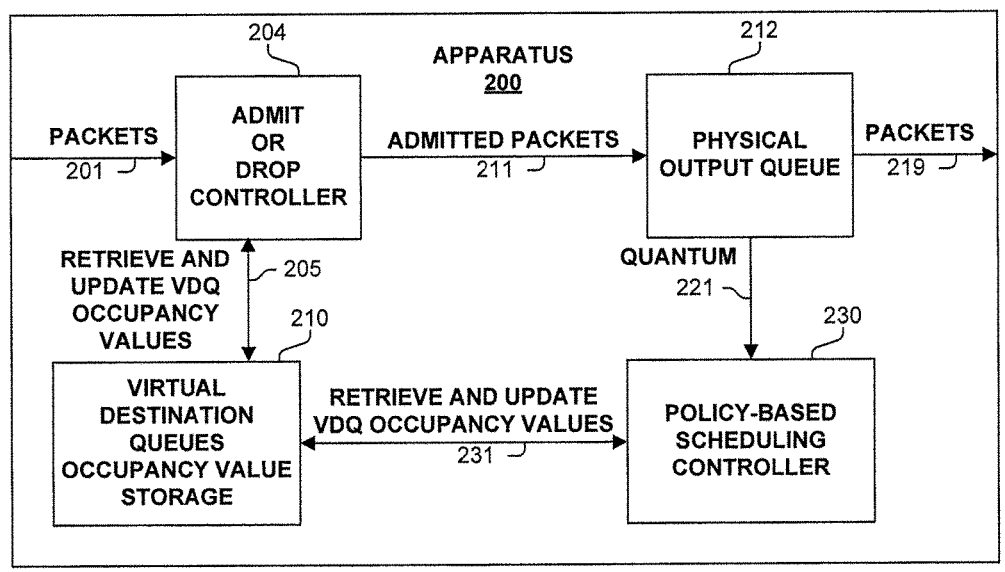
FIG. 2A illustrates an apparatus according to one embodiment.

FIG. 2A illustrates an apparatus 200 (e.g., used in a network node) according to one embodiment. A packet 201 is received by admit or drop controller, which retrieves (205) the occupancy level value corresponding to the virtual destination queue associated with the packet from virtual destination queues occupancy value storage 210. Controller 204, typically using a policing discipline, determines whether to drop the packet or admit the packet to physical output queue 212 based on this occupancy level value. In response to admitting the packet (211), controller 204 updates (205) the occupancy level value corresponding to the virtual destination queue associated with the packet in virtual destination queues occupancy value storage 210 based on a quantum associated with the packet (e.g., size, a constant).

Upon reaching the head of the output queue 212, a packet 219 is forwarded from apparatus 200, and a quantum associated with the packet (e.g., size, a constant) is provided (221) to policy-based scheduling controller 230. In response to a single or multiple received quantum values and according to the policy-based scheduling discipline, one or more virtual destination queues are determined for the received quantum (221) of one or more packets (219), and their corresponding occupancy values are updated (231) in virtual destination queues occupancy value storage 210.

Figure 2B:
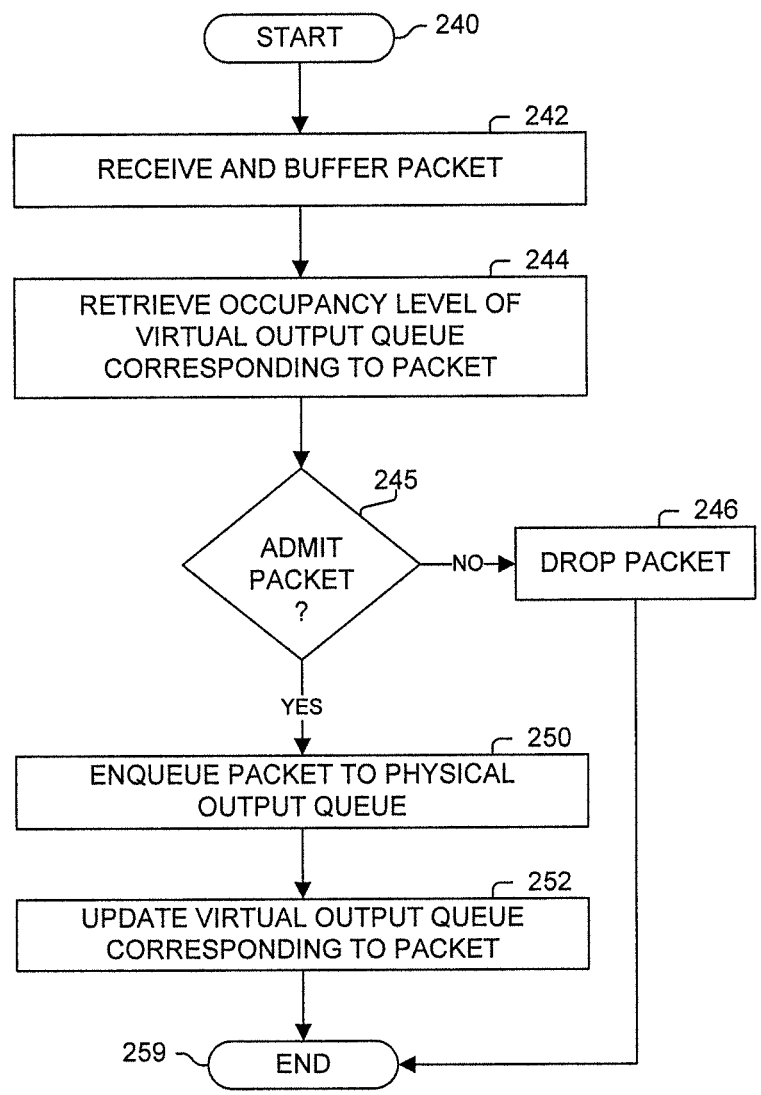
FIG. 2B illustrates a process according to one embodiment.

FIG. 2B illustrates a process performed by an admit or drop controller according to one embodiment. Processing begins with process block 240. In process block 242, a packet is received and buffered. In process block 244, the occupancy level of the virtual destination queue corresponding to the packet is retrieved. If in process block 245 a determination is made to drop the packet, then the packet is dropped in process block 246 and processing proceeds to process block 259. If in process block 245 a determination is made to admit the packet, then the packet is enqueued to the output queue in process block 250; the occupancy level of the corresponding virtual destination queue is updated based on a quantum of the packet in process block 252; and processing proceeds to process block 259. Processing of the flow diagram of FIG. 2B is complete as indicated by process block 259.

Figure 2C:
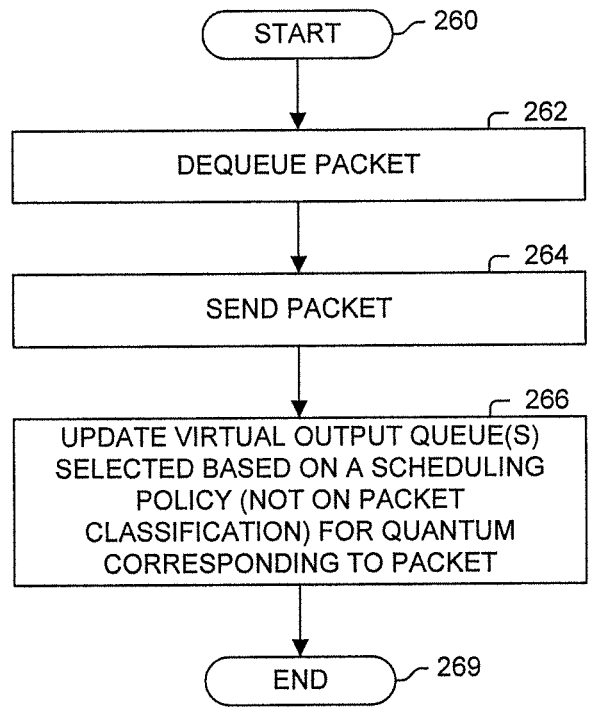
FIG. 2C illustrates a process according to one embodiment.

FIG. 2C illustrates a process according to one embodiment by the output queue and control logic (possibly controller) associated therewith. Processing begins with process block 260. In process block 262, the packet at the head of the queue is dequeued, and the packet is forwarded in process block 264. In process block 266, the occupancy level of one or more output queues is updated based on a scheduling policy (not on a packet classification) for quantum associated with the dequeued and sent packet. Processing of the flow diagram of FIG. 2C is complete as indicated by process block 269.

Figure 2D:
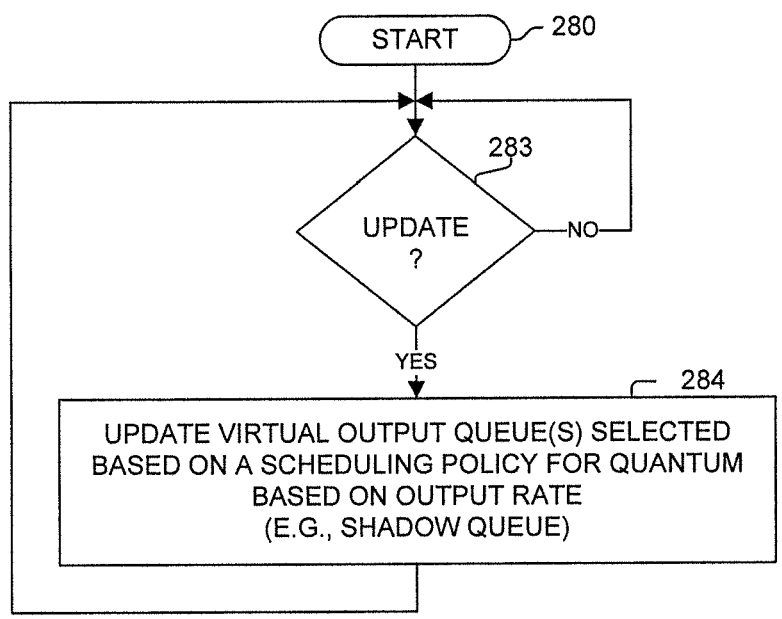
FIG. 2D illustrates a process according to one embodiment.

FIG. 2D illustrates a process according to one embodiment. Rather that updating the occupancy levels of virtual destination queues based on the actual quantum of each dequeued packet (individually or in the aggregate), the output rate of the output queue is used (possibly at a slightly slower rate in a shadow queue embodiment). Processing of the flow diagram of FIG. 2D begins with process block 280. When it is determined in process block 283 that it is time to update, processing proceeds to process block 284 wherein the occupancy levels of the virtual destination queues are updated according to a scheduling policy for the accumulated/determined quantum. Processing then returns to process block 283.

Figure 3A:
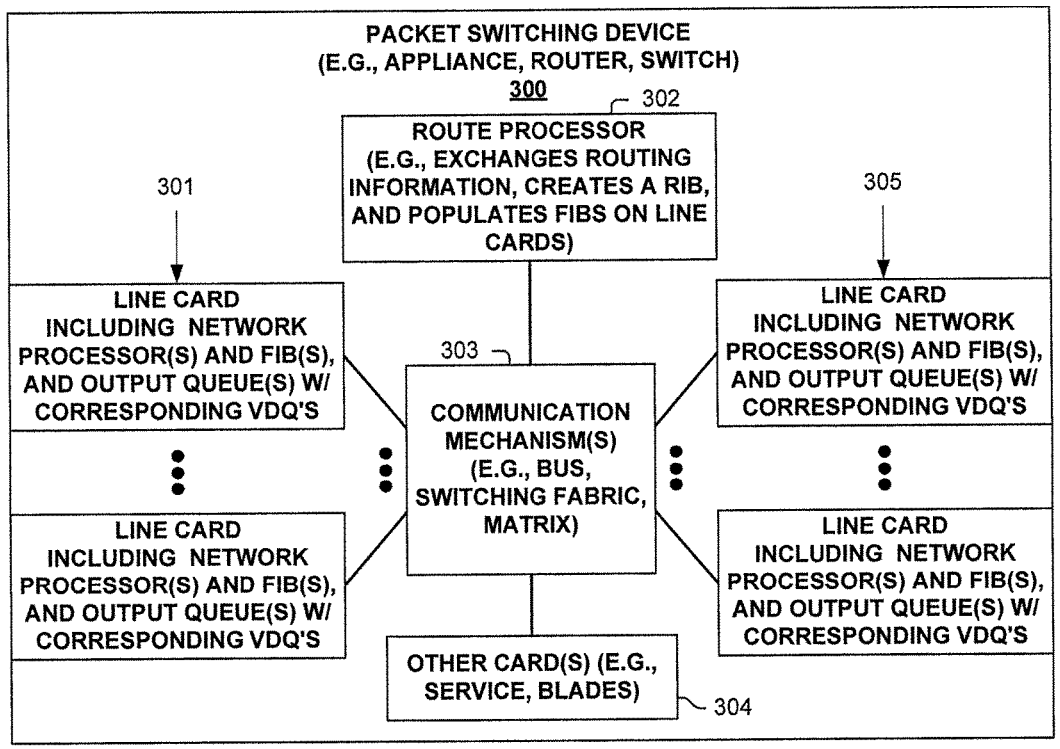
FIG. 3A illustrates a packet switching device according to one embodiment.

One embodiment of a packet switching device 300 is illustrated in FIG. 3A. As shown, packet switching device 300 includes multiple line cards 301 and 305, each typically with a virtual traffic manager as described herein and one or more network interfaces for sending and receiving packets over communications links (e.g., possibly part of a link aggregation group), and with one or more processing elements that are used in one embodiment associated with dropping or admitting packets to an output queue using policy-based scheduling and virtual destination queue occupancy values. Packet switching device 300 also has a control plane with one or more processing elements 302 for managing the control plane and/or control plane processing of packets associated with dropping or admitting packets to an output queue using policy-based scheduling and virtual destination queue occupancy values. Packet switching device 300 also includes other cards 304 (e.g., service cards, blades) which include processing elements that are used in one embodiment to process packets associated with dropping or admitting packets to an output queue using policy-based scheduling and virtual destination queue occupancy values, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 perform hash-based address matching on forwarding information bases (FIBs) to determine how to ingress and/or egress process packets. Even though the term FIB includes the word "forwarding," this information base typically includes other information describing how to process corresponding packets.

Figure 3B:
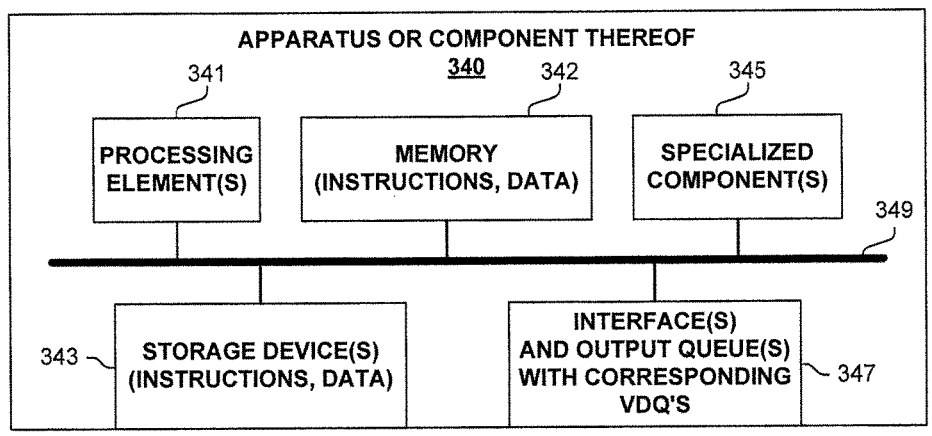
FIG. 3B illustrates an apparatus according to one embodiment.

FIG. 3B is a block diagram of an apparatus 340 used in one embodiment associated with dropping or admitting packets to an output queue using policy-based scheduling and virtual destination queue occupancy values. In one embodiment, apparatus 340 performs one or more processes, or portions thereof, corresponding to one of the flow diagrams illustrated or otherwise described herein, and/or illustrated in another diagram or otherwise described herein.

In one embodiment, apparatus 340 includes one or more processor(s) 341 (typically with on-chip memory), memory 342, storage device(s) 343, specialized component(s) 345 (e.g. optimized hardware such as for performing lookup and/or packet processing operations, etc.), and interface(s) 347 for communicating information including a virtual traffic manager as described herein (e.g., sending and receiving packets, user-interfaces, displaying information, etc.), which are typically communicatively coupled via one or more communications mechanisms 349 (e.g., bus, links, switching fabric, matrix), with the communications paths typically tailored to meet the needs of a particular application.

Various embodiments of apparatus 340 may include more or fewer elements. The operation of apparatus 340 is typically controlled by processor(s) 341 using memory 342 and storage device(s) 343 to perform one or more tasks or processes. Memory 342 is one type of computer-readable/computer-storage medium, and typically comprises random access memory (RAM), read only memory (ROM), flash memory, integrated circuits, and/or other memory components. Memory 342 typically stores computer-executable instructions to be executed by processor(s) 341 and/or data which is manipulated by processor(s) 341 for implementing functionality in accordance with an embodiment. Storage device(s) 343 are another type of computer-readable medium, and typically comprise solid state storage media, disk drives, diskettes, networked services, tape drives, and other storage devices. Storage device(s) 343 typically store computer-executable instructions to be executed by processor(s) 341 and/or data which is manipulated by processor(s) 341 for implementing functionality in accordance with an embodiment.

Figure 4:
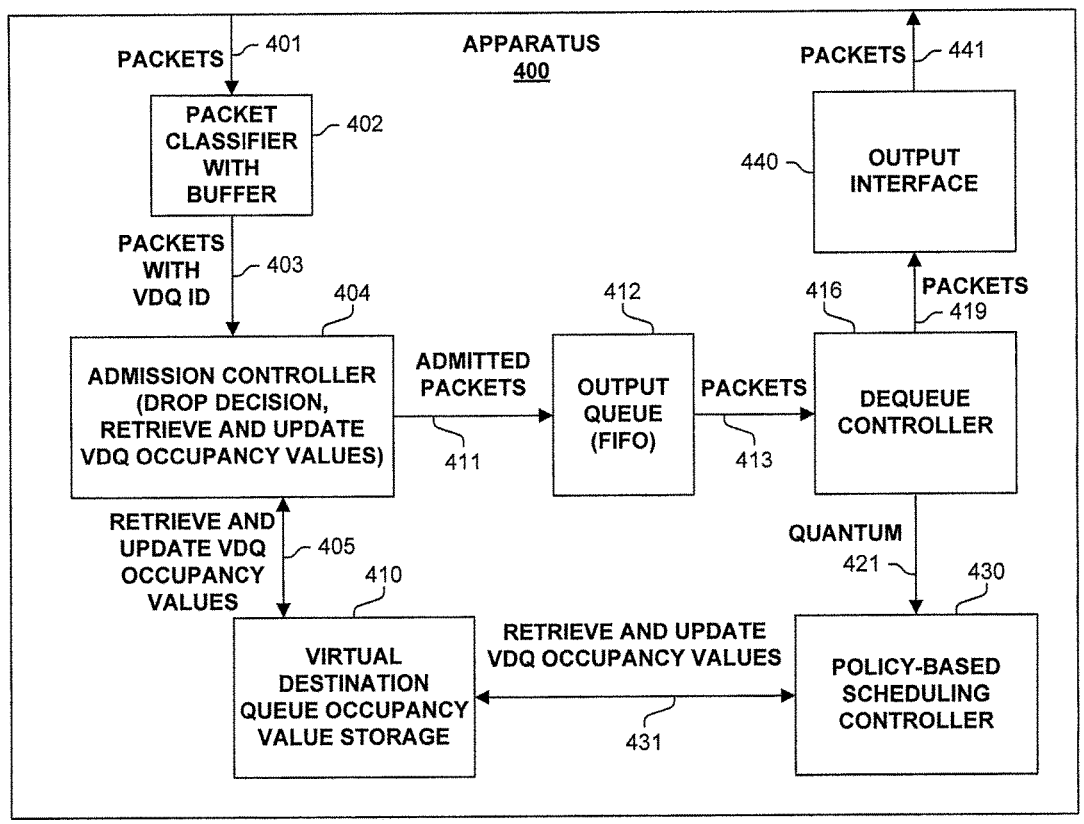
FIG. 4 illustrates an apparatus according to one embodiment.

FIG. 4 illustrates an apparatus 400 (e.g., used in a network node) according to one embodiment. A packet 401 is received by classifier with buffer 402. A classifier, based on one or more fields of the packet and programmed information, determines the virtual destination queue (VDQ) associated with the packet, and forwards (403) the packet with an identification of the VDQ (VDQ ID) to admission controller 404.

Admission controller 404 retrieves (405) the occupancy level value corresponding to the VDQ ID from virtual destination queues occupancy value storage 410. Controller 404, typically using a policing discipline, determines whether to drop the packet or admit the packet to physical output queue 412 based on this occupancy level value. In response to admitting the packet (411), controller 404 updates (405) the occupancy level value corresponding to the VDQ ID in virtual destination queues occupancy value storage 410 based on a quantum associated with the packet (e.g., size, a constant).

Upon reaching the head of the output queue 412, a packet (413) is dequeued by dequeue controller 419, which provides the packet (419) to output interface 440, with the packet being sent 441 from apparatus 400. Dequeue controller 419 also provides (421) a quantum associated with the packet (e.g., size, a constant) to policy-based scheduling controller 430. In response to a single or multiple received quantum values and according to the policy-based scheduling discipline, one or more virtual destination queues are determined for the received quantum (431) of one or more packets (419), and their corresponding occupancy values are updated (431) in virtual destination queues occupancy value storage 410.

Figure 5A:
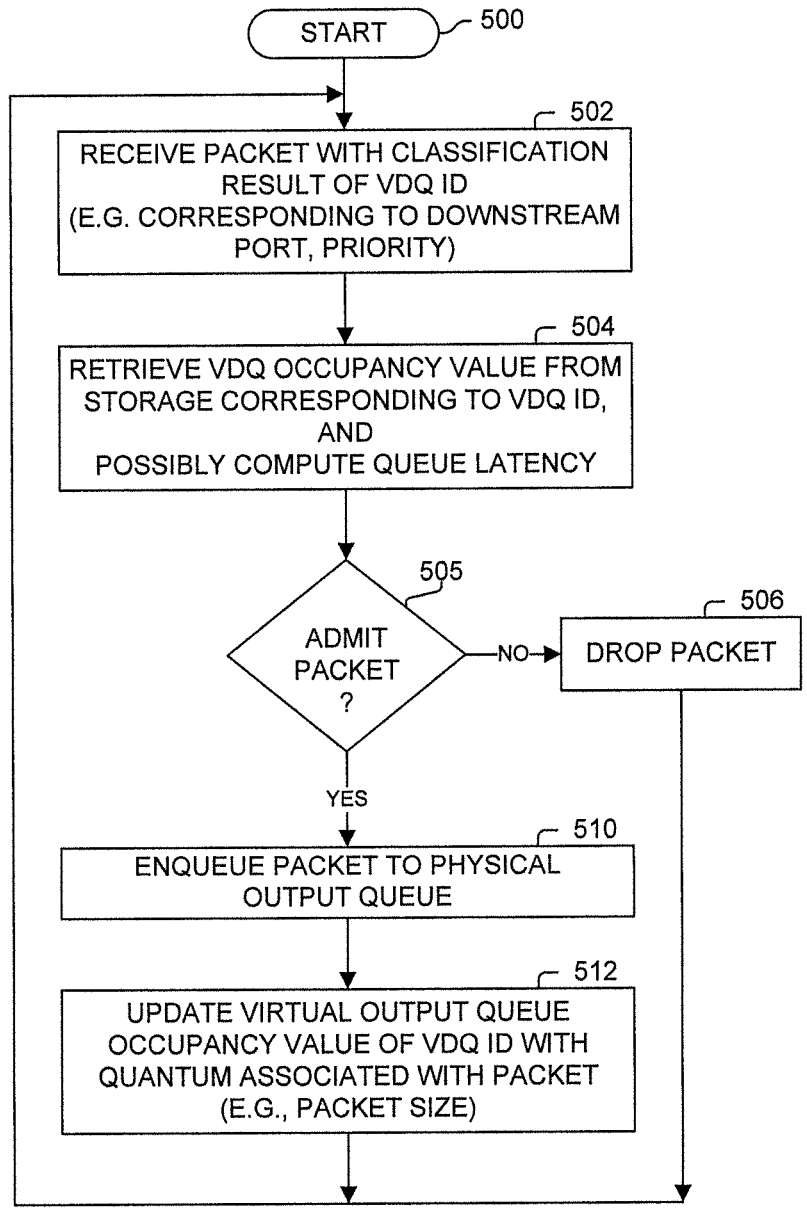
FIG. 5A illustrates a process according to one embodiment.

FIG. 5A illustrates a process performed by an admission controller according to one embodiment. Processing begins with process block 500. In process block 502, a packet with a classification result of VDQ ID is received. The virtual destination queue typically corresponds to a downstream port or sub-port, priority, or other entity or discipline for which an independent drop policy is desired. In process block 504, the occupancy level corresponding to the VDQ ID is retrieved from storage. Queue latency is possibly computed depending on the policing or other discipline of the one embodiment used to determine whether to admit or drop the packet. In response to a determination in process block 505 to drop the packet, the packet is dropped in process block 506, and processing returns to process block 502. In response to a determination in process block 505 to admit the packet, the packet is enqueued to the output queue in process block 510; the occupancy level corresponding to VDQ ID is updated (e.g., the size of the packet is added to its current value) in process block 512; and processing returns to process block 502.

Figure 5B:
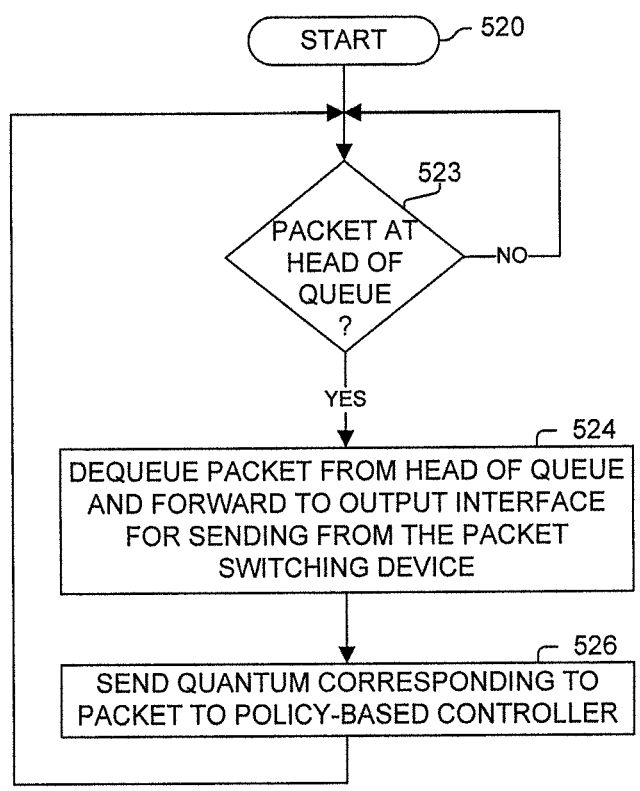
FIG. 5B illustrates a process according to one embodiment.

FIG. 5B illustrates a process according to one embodiment by a dequeue controller associated with the physical output queue of one embodiment. Processing begins with process block 520. Processing remains at process block 523 until there is a packet at the head of the output queue and then processing proceeds to process block 524. In process block 524, the packet at the head of the output queue is dequeued, and the packet is forwarded to the output interface and forwarded from the apparatus. In process block 526, a quantum associated with the dequeued packet is provided to the policy-based controller; and processing returns to process block 523. In one embodiment, an aggregate quantum of multiple packets is provided to the policy-based controller rather than on an individual packet basis, which reduces the amount of communication there between.

Figure 5C:
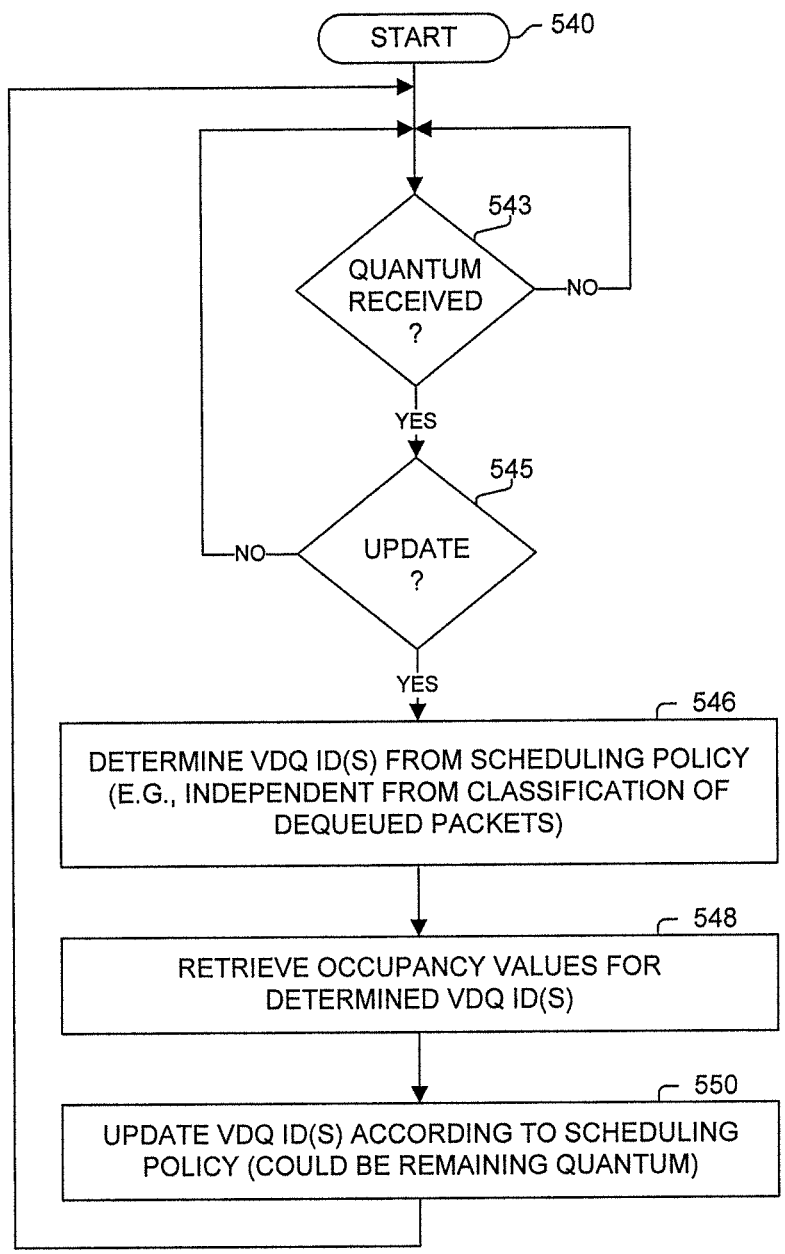
FIG. 5C illustrates a process according to one embodiment.

FIG. 5C illustrates a process performed by a policy-based controller according to one embodiment. Processing begins with process block 540. Processing remains at process block 543 until some quantum has been received from dequeue controller, then proceeds to process block 545. As determined in process block 545, if an occupancy level of one or more virtual destination queues should be updated at the present time, then processing proceeds to process block 546; else processing returns to process block 543. In one embodiment, quantum received from the dequeue controller may be accumulated (e.g., for a predetermined time period, until beyond a predetermined threshold) before updating a virtual destination queue (e.g., to reduce the overhead of this updating process).

In process block 546, the identification of one or more virtual destination queues (VDQ ID(s)) are determined from scheduling policy, which is independent from the classification of packets used to updated the virtual destination queues by the admission controller. In process block 548, the occupancy level(s) for these determined virtual destination queue(s) are retrieved from storage. In process block 550, the occupancy level(s) for these determined virtual destination queue(s) are updated in storage. In one embodiment, there may be remaining quantum which will be used in a subsequent update, as the occupancy level of a virtual destination queue cannot be less than empty. Processing returns to process block 543.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
for each particular packet of a plurality of particular packets: in response to determining to admit said particular packet to an output queue based on a particular destination queue occupancy value of a plurality of destination queue occupancy values, with the particular destination queue occupancy value corresponding to said particular packet, a packet switching device admitting said particular packet to the output queue and updating the particular destination queue occupancy value based on an enqueuing quantum of said particular packet, with the output queue being a first-in-first out (FIFO) queue, and with each of the plurality of destination queue occupancy values reflecting an occupancy value of a different virtual destination queue;
the packet switching device repeatedly dequeuing a packet in first-in-first-out order from the output queue when the output queue is not empty; and
the packet switching device repeatedly updating one or more of the plurality of destination queue occupancy values according to a scheduling policy and based on scheduling quantum, with the scheduling policy being independent of the order of packets said dequeued from the output queue; wherein said scheduling quantum is determined based on said one or more packets' said enqueuing quantum that was used in said updating particular destination queue occupancy values associated with the prior said enqueuing of said one or more packets in the output queue, or said scheduling quantum is determined from a data rate associated with said dequeuing of packets from the output queue.

2. The method of claim 1, wherein said scheduling quantum is determined from a data rate associated with said dequeuing of packets from the output queue.

3. The method of claim 1, wherein said determining to admit includes classifying said particular packet to identify the particular destination queue occupancy value.

4. The method of claim 1, comprising: for each identifiable packet of a plurality of identifiable packets: dropping said identifiable packet in response to determining not to admit said identifiable packet to the output queue based on an identifiable destination queue occupancy value of the plurality of destination queue occupancy values corresponding to said identifiable packet.

5. The method of claim 4, comprising: classifying said identifiable packet to identify the identifiable destination queue occupancy value.

6. The method of claim 1, wherein each of the plurality of destination queue occupancy values corresponds to a forwarding path or constraint downstream of the output queue.

7. The method of claim 1, wherein the sum of all of plurality of destination queue occupancy values corresponds to a depth of the output queue.

8. The method of claim 1, wherein said scheduling quantum is determined based on said one or more packets' said enqueuing quantum that was used in said updating particular destination queue occupancy values associated with the prior said enqueuing of said one or more packets in the output queue.

9. The method of claim 8, wherein said one or more packets is exactly one packet.

10. An apparatus, comprising:
    storage that stores a plurality of destination queue occupancy values;
    an output queue, with the output queue being a first-in-first-out (FIFO) queue;
    an admission controller performs operations including for each particular packet of a plurality of particular packets: retrieves from said storage a particular destination queue occupancy value of the plurality of destination queue occupancy values corresponding to said particular packet, admits said particular packet to the output queue in response to determining to admit said particular packet based on the particular destination queue occupancy value, and updates the particular destination queue occupancy value based on a particular quantum of said particular packet, and with each of the plurality of destination queue occupancy values reflecting an occupancy value of a different virtual destination queue; and
    a dequeue controller repeatedly dequeuing a packet from the head of the output queue in response a packet being at the head of the output queue; and
    the policy-based scheduling controller repeatedly identifying one or more of the plurality of destination queue occupancy values based a scheduling policy and updating said identified one or more of the plurality of destination queue occupancy values based on an aggregate of the particular quantum of each of one or more of said packets said dequeued from the output queue, with the scheduling policy being independent of the order of said packets said dequeued from the output queue.

11. The apparatus of claim 10, wherein said operations performed by the admission controller include for each identifiable packet of a plurality of identifiable packets, drops said identifiable packet in response to determining not to admit said identifiable packet to the output queue based on an identifiable destination queue occupancy value of the plurality of destination queue occupancy values, with the identifiable destination queue occupancy value corresponding to said identifiable packet.

12. The apparatus of claim 11, comprising: a packet classifier that determines a particular location in said storage of the particular destination queue occupancy value used by the admission controller for each said particular packet.

13. The apparatus of claim 10, wherein each of the plurality of destination queue occupancy values corresponds to a forwarding path or constraint downstream of the output queue.

14. The apparatus of claim 10, wherein the sum of all of plurality of destination queue occupancy values corresponds to a depth of the output queue.

15. The apparatus of claim 10, comprising: a packet classifier that determines a particular location in said storage of the particular destination queue occupancy value used by the admission controller for each said particular packet.

16. The apparatus of claim 10, wherein said particular quantum is a size of a corresponding packet said enqueued or dequeued.

17. The apparatus of claim 10, wherein said particular quantum is a constant value.

18. A method, comprising:
    for each particular packet of a plurality of particular packets, a packet switching device performs operations including:
    classifying said particular packet to identify a particular destination queue occupancy value of a plurality of destination queue occupancy values;
    in response to determining to admit said particular packet to an output queue based on the particular destination queue occupancy value: admitting said particular packet to the output queue, and updating the particular destination queue occupancy value based on a size of said particular packet;
    for each admitted packet of the plurality of particular packets, the packet switching device performing operations including dequeuing said admitted packet in first-in-first-out order from the output queue; and
    for each successive one or more of said admitted packets said dequeued from the output queue: determining one or more of the plurality of destination queue occupancy values based on a scheduling policy independent of the order of said admitted packets being said dequeued from the output queue including being independent of the order of said successive one or more of said admitted packets said dequeued from the output queue, and updating each particular destination queue occupancy value of said one or more of the plurality of destination queue occupancy values by a corresponding amount of quantum determined based on the scheduling policy with the aggregate of the corresponding amount of quantum that each of said particular destination queue occupancy value was said updated being the aggregate of the size of said successive one or more of said admitted packets.

19. The method of claim 18, comprising: for each identifiable packet of a plurality of identifiable packets: dropping said identifiable packet in response to determining not to admit said identifiable packet to the output queue based on an identifiable destination queue occupancy value of the plurality of destination queue occupancy values corresponding to said identifiable packet.

20. The method of claim 19, comprising: classifying said identifiable packet to identify the identifiable destination queue occupancy value.

21. The method of claim 18, wherein each of the plurality of destination queue occupancy values corresponds to a forwarding path or constraint downstream of the output queue.

22. The method of claim 18, wherein the sum of all of plurality of destination queue occupancy values corresponds to a depth of the output queue.

\* \* \* \* \*